Nov. 13, 1951  C. W. EVANS  2,575,102
COMBINATION BOARD FOR BEEHIVES
Filed July 23, 1946  2 SHEETS—SHEET 1
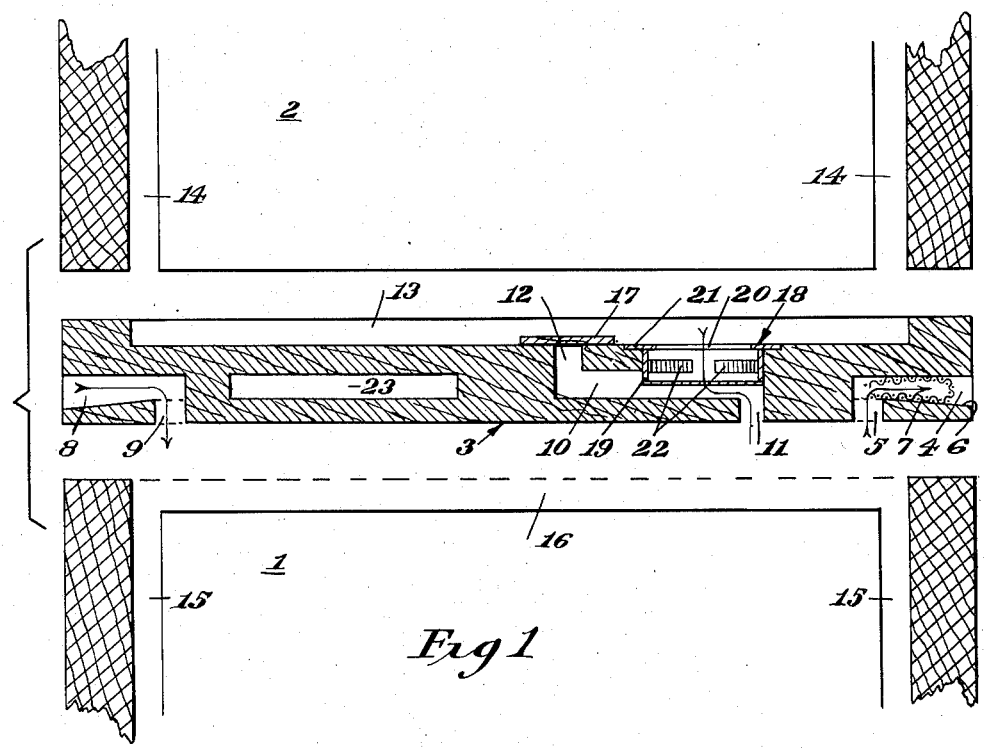
Fig 1
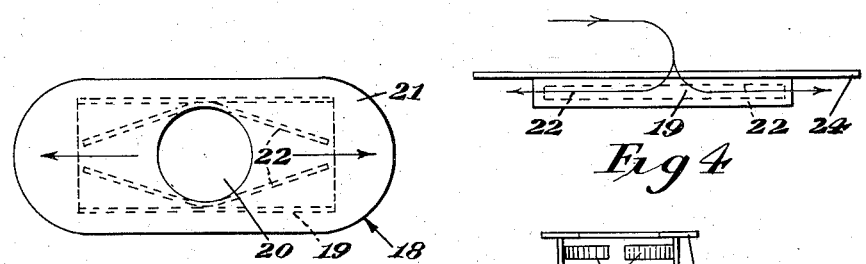
Fig 3
Fig 4
Fig 5
Inventor
Clarence W. Evans
By Ralph B. Stewart
Attorney Patented Nov. 13, 1951

2,575,102

UNITED STATES PATENT OFFICE 2,575,102

COMBINATION BOARD FOR BEEHIVES

Clarence W. Evans, Portville, N. Y.

Application July 23, 1946, Serial No. 685,721

4 Claims. (Cl. 6—4)

This invention relates to a combination board for a bee hive, serving to separate the brood chamber from the honey chamber, and also embodying various bee passages and ventilating ducts.

One object is to exclude the queen bee from the honey chamber in a natural manner without likelihood of injury or undue excitement.

Another object of the invention is to provide a free passageway between the brood chamber and honey chamber for the worker bees which may be adjusted when desired to prevent passage of bees into the honey chamber while permitting them to pass freely from the honey chamber to the brood chamber.

A further object of the invention is to provide in the combination board a plurality of ventilating ducts for the brood chamber while protecting the same from excessive light and stormy weather; one or more of which ducts may be utilized to provide an entrance into the brood chamber from outside the hive.

Still another object of the invention is to provide a relatively large unbroken and protected clustering area at the top of the brood chamber on the lower face of the combination board.

In the accompanying drawing:

Figure 1 is a fragmentary exploded view showing in vertical section, as indicated by broken lines 1—1 of Figure 2, a combination bee hive board in accordance with this invention disposed between a conventional brood chamber and honey chamber.

Figure 3 is a detail top plan of a one-way bee escape incorporated in the board.

Figure 4 is a side elevation of the bee escape shown in Figure 3.

Figure 5 is an end elevation thereof.

Figure 2:
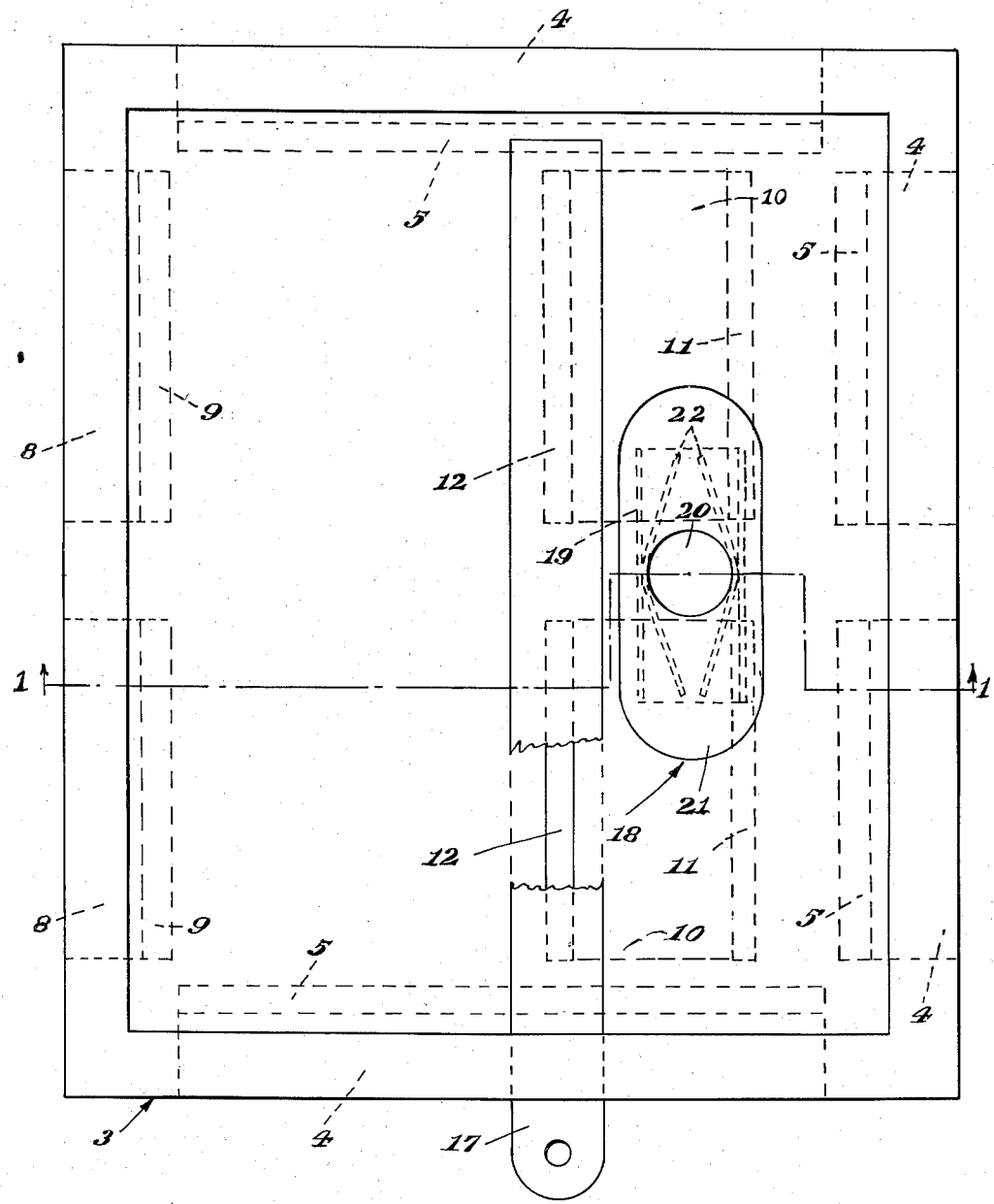
Figure 2 is a top plan of the bee hive board shown in section in Figure 1.

Referring to the drawing in detail, the numerals 1 and 2 indicate respectively the brood chamber and honey chamber of a conventional bee hive having a combination bee hive board indicated generally at 3 placed therebetween, the board being formed in accordance with this invention.

Opening through the edge face of the board 3 are a plurality of horizontal passageways 4 communicating at their inner extremities with vertical passageways 5 and in connection therewith providing ventilating ducts from the brood chamber 1 to the atmosphere. The passageways 4 are provided with downwardly and outwardly sloping bottom walls 6 to carry off any rain or the like entering the passageways. Owing to the abrupt angle between the passageways 4 and 5, the passage of light therethrough to the interior of the hive is substantially prevented. Disposed in each of the passageways 4 is a screen 7 which is of a length coextensive with the passageway in which placed, and preferably doubled upon itself so that when the doubled edges are inserted into the passageway, the inherent resilience of the material will hold the screen in place. Preferably passageways 4 and 5 are provided in the edge faces on three sides or edges of the board.

At the front of the hive, the board 3 is provided in its edge face with a horizontal passageway 8 communicating at its inner extremity with a vertical passageway 9. The passageways 8 and 9 are similar in every respect to the passageways 4 and 5 but are entirely open so as to provide, not only a ventilating duct but also an entrance from outside the hive into the brood chamber 1. If additional entrances should be desired, one or more of the screens 7 may be removed from the ventilating ducts. Passageways 4, 5 and 8, 9 are sufficiently wide to permit free passage of the queen bee as well as the worker bees.

Extending throughout a portion of the board 3, intermediate the upper and lower faces thereof, is a horizontal bee passageway 10 which is in communication with one or more vertical passageways 11 connecting the same with the brood chamber 1. The passageway 10 also communicates with one or more vertical passageways 12 connecting the same with the honey chamber 2. Preferably the board 3 will be provided in the upper face thereof with a recess 13 extending beneath the comb frames in the honey chamber 2 and providing a relatively large passageway between the vertical passageway 12 and the conventional passageways 14 provided at the sides of the honey chamber. Similar vertical passageways 15 and horizontal passageway 16 in the brood chamber 1 are in communication with the vertical passageway 11 whereby normally worker bees may travel freely between the chambers 1 and 2 through the passageways 10, 11 and 12. The passageway 11 is of appropriate size to permit worker bees to pass freely therethrough but to prevent the queen from passing through so that she may be naturally and effectively excluded from the honey chamber 2 without the exciting activities of the latter being exposed to her view. Also, as shown in the drawing, the passage 11 is displaced from the passage 12 and this provides better isolation of the queen bee from the activities in the honey chamber.

In order that an attendant may have access to the honey chamber free of bees when desired, the board 3 is provided with a closure 17 for the passageway 12, and with a bee escape disposed between the passageways 13 and 10 and indicated generally at 18. With the closure 17 in position to block the passageway 12, the only path of travel between the chambers 1 and 2 is through the escape 18 which is designed to permit the free passage of bees from the chamber 2 to the chamber 1 but to prevent passage from the chamber 1 to the chamber 2.

The escape 18 consists essentially of a relatively flat box-like element 19 open at its ends and formed with a centrally disposed opening 20 through its top. The top projects beyond the sides and ends of the element 19 as shown at 21 and provides means for securing the element in position. Extending lengthwise of the element 19 are a pair of opposed, arcuate, resilient strips 22, the center portions of which span the opening 20, and the end portions of which lie in closely spaced relation adjacent the open ends of the element 19. Owing to the resiliency of the strips 22, and to the spacing of the end portions thereof, bees entering the element 19 through the opening 20 may readily force their way between the opposed end portions to the passageway 10, but are unable to pass between the strips in the opposite direction.

Between the vertical passageways 9 and 11, the lower face of the board 3 is unbroken to provide a relatively large flat clustering area at the top of the brood chamber which is fully protected and completely separated from the activities of the honey chamber. In order that this clustering area may be as large as possible, the vertical passage 11 should be located as far from the center of the board as possible. A dead air insulating space 23 is provided in the board 3 above the clustering area.

From the foregoing description it is believed that the many advantages of a combination board in accordance with this invention will be readily apparent.

I claim:

1. A combination board adapted to be positioned horizontally between the brood chamber and the honey chamber of a bee hive comprising a flat board having a horizontally extending passage formed between the upper and lower faces thereof, said passage communicating with said brood chamber through an opening formed in the lower face of said board near the outer edge thereof, and communicating with the honey chamber through an opening formed in the upper face of said board near the center of said board, whereby the central portion of the lower face of said board is unbroken and forms a cluster area, a one-way bee escape carried by said board and having an inlet port opening into said honey chamber and an outlet port connected with the horizontal portion of said bee passage, and manually operable means for closing the opening of said passage in the upper face of said board, whereby the bees passing through said bee escape may enter the brood chamber through said opening in the lower face of said board.

2. A combination board according to claim 1 wherein said board is provided with a plurality of ventilating ducts opening through the edge faces and the lower face of the board, that section of each duct opening through said edge face being disposed substantially at right angles to that section of each duct opening through said lower face, one of said ducts providing an entrance into the brood chamber, and a screen blocking the ducts which are not utilized as entrances into the brood chamber, the bottom wall of each of said ducts sloping downwardly and outwardly to prevent any rain that enters the same from flowing into the brood chamber.

3. A combination board according to claim 1 wherein the central area of the upper face thereof is recessed to provide a bee passageway beneath the honey frames.

4. A combination board according to claim 1 wherein ventilating passages are formed therein and opening through the edge faces and the lower face of said board, each of said ventilating openings having a folded wire screen inserted therein to block the passage of bees but permit ventilation of the brood chamber, said wire screen having one dimension equal to the length of said ventilating opening and being folded parallel with said dimension into a U-shape, the portions of said screen forming the legs of the U being urged against the sides of said ventilating passageway by the natural resiliency of said wire screen and holding said screen in said ventilating opening.

CLARENCE W. EVANS.

REFERENCES CITED

The following references are of record in the file of this patent:

UNITED STATES PATENTS

| Number | Name | Date |
|---|---|---|
| 205,429 | Shoemaker | June 25, 1878 |
| 736,226 | Danzenbaker | Aug. 11, 1903 |
| 987,425 | Blagg | Mar. 21, 1911 |
| 1,113,886 | Douglass | Oct. 13, 1914 |
| 1,544,468 | McPhee | June 30, 1925 |
| 1,554,305 | Sullivan | Sept. 22, 1925 |
| 2,128,000 | King | Aug. 23, 1938 |